United States Patent [19]

Weston

[11] Patent Number: 4,681,133

[45] Date of Patent: Jul. 21, 1987

[54] ROTATABLE BALL VALVE APPARATUS AND METHOD

[75] Inventor: Harry Weston, West Sussex, United Kingdom

[73] Assignee: Hydril Company, Los Angeles, Calif.

[21] Appl. No.: 549,256

[22] Filed: Nov. 4, 1983

[30] Foreign Application Priority Data

| Nov. 5, 1982 [GB] | United Kingdom | 8231601 |
|---|---|---|
| Nov. 11, 1982 [GB] | United Kingdom | 8232226 |
| Dec. 20, 1982 [GB] | United Kingdom | 8236158 |
| May 20, 1983 [GB] | United Kingdom | 8313970 |

[51] Int. Cl.⁴ .................... F16K 11/087; F16K 51/00
[52] U.S. Cl. .................................. 137/315; 137/327;
137/625.47; 166/86; 166/88; 166/95; 166/97; 251/58
[58] Field of Search ............ 137/625.46, 625.47, 137/269, 315, 327, 329, 329.1, 625.24; 251/207, 310, 357, 1 R, 58, DIG. 5, 1 A, 1 B; 166/86, 95, 373, 75 R, 75 A, 76, 77, 77.5, 75.1, 80, 88, 82, 95, 85, 97

[56] References Cited

U.S. PATENT DOCUMENTS

| 662,438 | 11/1900 | Huckins | 137/625.47 X |
|---|---|---|---|
| 1,175,328 | 3/1916 | Wright | 137/614.17 X |
| 1,352,423 | 9/1920 | Arbon | 251/1 R |
| 1,587,030 | 6/1926 | Palmer | 251/1 |
| 2,704,579 | 3/1955 | Brown | 166/75 X |
| 3,707,161 | 12/1972 | Crawford | 137/269 |
| 3,982,725 | 9/1976 | Clark | 251/58 X |
| 3,985,150 | 10/1976 | Kindersley | 137/375 X |

FOREIGN PATENT DOCUMENTS 1138991 7/1960 Fed. Rep. of Germany ........ 251/58

Primary Examiner—Martin P. Schwadron
Assistant Examiner—Stephen M. Hepperle
Attorney, Agent, or Firm—Dodge, Bush & Moseley

[57] ABSTRACT

A safety valve and method is disclosed having a housing in which a rotatable valve is disposed between upper and lower passages and lateral outlets. The ball has a removable insert such that in one position of the ball, the insert can be removed to provide full bore access in line with the wall. The housing may be incorporated with the tubing head or may be attached to the top of the tubing head. During insertion of or workover of tubing, a blowout preventer may be attached to the top of the valve housing. The ball may be rotated for closing off the flow path from the well below. A Christmas tree may be installed after the blowout preventer is removed. Diverter valves may be connected to the lateral outlets. "T" shaped passages in the ball insert may be aligned with the lateral outlets and the tubing to divert well fluid when desired via the diverter valves. The valve may be used as a master valve of a Christmas tree with a control valve attached to the lateral outlet. This abstract of the disclosure is neither intended to define the scope of the invention, which is measured by the claims, nor is it intended to limit the invention in any way.

47 Claims, 13 Drawing Figures

4,681,133

ROTATABLE BALL VALVE APPARATUS AND METHOD

BACKGROUND OF THE INVENTION

1. Field of the Invention

The invention generally relates to a valve which may be used as a master valve for a production well, or alternatively as a safety or blowout preventer valve between a tubing head and a production (Christmas) tree. The invention also generally relates to valve apparatus providing complete control over a well during installation or workover of tubing in an oil or gas well.

More specifically, the invention, in its blowout preventer embodiment, is directed for use on offshore production platforms where a plurality of producing oil wells are disposed in close proximity to one another and where there is an emergency need to simultaneously shut in all the producing wells rapidly, safely, reliably, and economically while facilitating rapid resumption of production after the emergency has passed.

The invention may also serve as a substitute for a master valve in production wells where a vertical production tree is eliminated in favor of horizontal plane apparatus.

2. Description of the Prior Art

On marine production platforms there are often many producing wells in close proximity to one another. Each of the wells typically has a production wellhead from which production tubing extends from the well. The wellhead typically has a production or "Christmas" tree connected to it for controlling the gas or fluid flowing in the production tubing during production of the well. A master gate valve disposed in each production tree may be closed to shut off flow from the well, but such gate valves may be difficult to close rapidly during an emergency due to their location, and indeed may not be available as where the production tree is removed from the wellhead during workover of the well.

Downhole safety valves may also be provided in each of the producing wells; but there is always the danger that a downhole safety valve may not be operable or in place during workover of the well. As indicated above, during workover, the production tree may have been removed in order to install a blowout preventer stack atop the production wellhead for control of the well during workover. Such a blowout preventer stack is of the kind used typically in drilling operations and includes one or more ram-type blowout preventers and an annular blowout preventer. Until the blowout preventer is installed on the production wellhead and connected to its controls, well control in the past for the well has depended upon remotely installed plugs in the well. Such plugs have not always been reliable.

During an emergency on an offshore platform, for example, where a fire or leaking gas or fluid from one production tree endangers all of the wells and indeed the platform itself, there has developed the need for an apparatus and method for its installation and refurbishing which may be used to rapidly close off the flow path of the production tubing in each of the wells.

As indicated above, a shear ram blowout preventer similar to those used in marine blowout preventer stacks for drilling operations could be a candidate for satisfying such a need. The use of a shear ram blowout preventer has a major disadvantage in that the tubing above the tubing hanger must be replaced after it has been sheared before production can be resumed. Shear ram blowout preventers crush the production tubing which must be replaced before the well can be put back into operation. In order to replace the crushed tubing, the production tree must be removed and a drilling blowout preventer and rig installed in order to remove the damaged tubing and replace it with new tubing.

Another disadvantage of using a shear ram blowout preventer similar to that used in drilling operations is that after the preventer crushes and shears the tubing, the well can only be controlled by pumping mud into it to control the pressure in the well. A plug typically cannot be installed through the tubing which has been crushed during the shearing by the preventer.

IDENTIFICATION OF OBJECTIVES OF THE INVENTION

Thus, it is an important objective of the invention to provide apparatus intermediate a wellhead and a Christmas tree serving as a safety valve which does not crush the tubing extending into the well.

Another important object of the invention is to provide apparatus for controlling the well during removal of a blowout preventer atop the apparatus and while it is being replaced with a Christmas tree.

Another object of the invention is to provide an apparatus and method for controlling the well at all times, in conjunction with a blowout preventer atop the apparatus, while installing or working over production tubing in the well.

A key objective, in other words, is to provide continuous uninterrupted security for a well to which it is attached from the time prior to running production tubing to the final abandonment of the well.

Another key objective of the invention is to provide apparatus which does not destruct part of the apparatus, and thus provides a safety means for operating personnel to use during operations on the well in which they do not hesitate to use for fear of having to later replace a part during a time consuming procedure. In other words, it is an objective of the invention to provide a safety valve which is entirely reversible without destruction of tubing or valve parts.

Most Christmas trees are vertically oriented; that is, a master valve is provided in a spool attached to the wellhead. Control valves are then provided laterally from the spool above the master valve. The well is produced and controlled through the control valves.

Some wells demand that the vertical height of the Christmas tree be minimized. For example, in a shallow subsea completion, it is desirable to minimize the height of the tree so that vessels passing above will not contact the tree during extremely low tide conditions. Another example is where the tree height must be minimized for esthetic reasons, say in a city.

Thus, another important objective of the invention is to provide an apparatus which may serve as a master valve of a production tree where control valves may be disposed at the same height as that of the master valve.

SUMMARY OF THE INVENTION

The general objects of the invention as outlined above are provided, as well as other inmportant features and advantages of the invention, are described in the summary of the invention which follows. A more specific object of the invention is to provide a producing well safety valve in which no element is replaced and in which the production tubing is not disturbed after the valve has been closed and which does not require that the production tree be removed after the valve has been closed.

Another object of the invention is to provide a safety valve in a producing well which can be immediately put back into production after the valve has been closed.

Another object of the invention is to provide a safety valve for use in a producing well in which access to the production tubing is available via a blowout preventer attached to its top.

Another object of the invention is to provide valve apparatus which enables the production tubing to be connected directly to a lateral valve line.

Yet another object of the invention is to provide apparatus useful during loss of control over the well to regain control over the well by lateral access to the production tubing in order to carry out any of a wide range of procedures such as circulation, bullheading, pressure relieving, killing, etc., prior to vertical re-entry of the well.

It is still another object of the invention to provide an apparatus and method for controlling the well during completion of the tubing into the well or during workover at the time that the blowout preventer stack is removed in order to install the Christmas tree or vice versa.

It is another object of the invention to provide complete control over the well during wireline operations at any stage of the operations in a production well.

According to the invention, a valve is provided having a housing with at least one lateral outlet and an upper and a lower passage where each of the outlet and upper and lower passages are open to a chamber in the housing. A rotatable ball is provided in the chamber having an outer part with means for seating it within the chamber. The outer part has an insert cavity along its central axis. The insert cavity has an inner diameter substantially the same as that of the upper passage of the housing. The outer part also has a perpendicular passage extending from the insert cavity to the exterior of the outer part. A removable inner part is provided having an outer diameter substantially the same as that of the insert cavity of the outer part and having intersecting passages forming a "T" shape, the head passage of the "T" being along the central axis and the base passage of the "T" being aligned with the perpendicular passage of the outer part.

Means are provided for aligning the inner part with the outer part after the inner part is inserted into the outer part. The aligning means includes a spring loaded anti-rotation key means disposed on the exterior surface of the inner part and a depression means in the interior surface of the insert cavity for angularly locking the inner part in the insert cavity of the outer part and alignment of the base bore of the "T" of the inner part with the perpendicular passage of the outer part but allowing the inner part to move with respect to the outer part along the central axis.

Means are provided for axially aligning the inner part within the outer part whereby after the inner part is inserted into the outer part, the base bore of the "T" of the inner part may be axially aligned with the perpendicular passage of the outer part. The axial aligning means comprises latch means including snap ring means disposed about the outer wall of the inner part and a groove means about the inner wall of the insert cavity of the outer part for cooperatively holding the inner part to the outer part on axial alignment of the outer part with respect to the inner part after insertion of the inner part in the insert cavity and for allowing the inner part to be pulled axially free from the outer part in one direction along the central axis of the outer part but not the other.

In one embodiment of the invention, the housing includes two lateral outlets open to the chamber in the housing. Wing valves may be placed in the lateral outlets for either diverting flow from the production tubing or for serving to control flow from the tubing during production of the well. Such lateral outlets may also be used for "killing" the well.

In this embodiment of the invention, the valve with the rotatable ball having a removable insert may serve as the master valve of a production tree and the wing valves may serve as the production control valves of the production tree. Vertical access to the tubing in communication with the lower passage is available via the upper passage when the removable insert is removed. A cap for the upper passage is used when the valve serves as the master valve in the normal production mode of the production tree.

Seating means for seating the exterior of the ball with the lateral outlet are provided for the valve. The seating means includes an arcuate annular surface about the opening of the lateral outlet, the curvature of the surface being substantially the same as the curvature of the ball. Preferably, an elastomeric member is disposed in a slot in the annular surface about the opening of the lateral outlet in order to seal the exterior of the ball with the lateral outlet.

After tubing has been landed in the lower passage below the ball, means are provided for seating the exterior of the ball with the lower conduit placed in the lower passage. Preferably, the lower conduit is a coupling member disposed in the lower passage of the housing and having an upwardly facing opening to the chamber. The coupling member is in fluid communication with tubing extending below from the lower passage of the housing and the seating means is an arcuate annular surface about the opening of the coupling member. The curvature of the annular surface is substantially the same as the curvature of the ball. Spring means are provided for urging the annular surface of the coupling member against the exterior of the ball.

According to the invention, a closure member is provided for cooperatively acting with the seating means by which the ball is seated within the chamber for securing the outer part of the ball within the chamber and axially aligning the perpendicular passage of the outer part with the lateral outlet. Means are provided for seating the exterior of the ball with an upper conduit placed in the upper passage of the housing. The seating means for seating the upper conduit is an arcuate annular surface about the opening of the upper conduit wherein the curvature of the surface is substantially the same as the curvature of the rotatable ball. A sealing means for sealing the upper conduit to the exterior of the ball includes an elastomeric member in a slot in the annular surface about the opening of the upper conduit.

Means are provided for rotating the annular ball within the housing. The rotating means includes a ball stem means extending through the housing, one end of the ball stem means having a coupling means for rotatably coupling the ball stem to the ball. The other end of the ball stem means extends through the outer wall of the housing. Motive means are coupled to the other end of the ball stem for rotating the stem and the ball. The motive means includes an hydraulically driven rotary actuator coupled to the end of the shaft. The motive means additionally comprises a hand wheel removably mounted upon the end of the shaft. The valve further includes a shaft mounted position indicator means mounted on the end of the shaft for providing a visual indication of the shaft rotation and the position of the ball within the housing.

According to another feature of the invention, cutting means are secured in the head passage of the "T" of the inner part for cutting a wireline cable when the cable extends through the head passage.

Thus, according to the invention, there is provided apparatus for controlling the flow in a wellhead in which a ball is disposed in a housing having upper and lower conduits and at least one laterally disposed outlet. The ball includes a removable insert and three output ports with flow paths in the interior of the ball communicating with the three ports and an unported surface. The means for rotating the ball is provided for rotation of the ball among at least three positions. The first position is where two of the ports in the ball are aligned respectfully with the ends of the upper and lower conduits disposed in the housing and a third port is aligned with the outlet. When the ball is in the first position, a flow path is established between ends of the lower and upper conduits and the lateral outlet. The second position is where one of the ports in the ball is aligned with the outlet and a second of the ports in the ball is aligned with the end of the lower conduit and the unported surface is aligned with the end of the upper conduit.

When the ball is in the second position, a flow path is established between the end of the lower conduit and said outlet and flow is prevented to the end of the upper conduit. In the third position, the unported surface is aligned with the end of the lower conduit. When the ball is in the third position flow is prevented to the lateral outlet or to the upper conduit from the lower conduit.

According to the invention, the three output ports with flow paths in the interior of the ball comprise a "T" shaped bore in the removable insert and a hole in the outer part substantially aligned with the bore in the removable insert defining the base of the "T" shape.

A method of controlling a well during installation of production tubing in a wellhead and attaching a Christmas tree for production of the well is provided. A valve housing, according to the invention, having at least one lateral outlet, an upper passage and a lower passage is connected to the wellhead or is provided integrally with the wellhead. The lower passage of the housing communicates with the wellhead and each of the outlets the upper and lower passages are opened to the chamber in the housing. Seated within the chamber of the housing is an outer part of a rotatable ball. The outer part has an insert cavity along a central axis of the outer part and the insert cavity has an inner diameter substantially the same as or less than that of the upper passage. The outer part has a perpendicular passage extending from the insert cavity to the exterior of the outer part.

Atop the housing is a blowout preventer removably attached to the upper part of the housing with the vertical flow path of the blowout preventer communicating with the upper passage of the valve housing. The diameter of the vertical flow path of the blowout preventer is substantially the same as or less than that of the upper passage of the valve housing, the inner diameter of the insert cavity and the lower passage. The method comprises the steps of first setting tubing in the wellhead through the blowout preventer, through the upper passage, through the insert cavity of the outer part of the rotatable ball and the lower passage of the valve apparatus housing.

The next step includes installing an inner part of the rotatable ball within the insert cavity of the outer part of the rotatable ball. The inner part has an outer diameter substantially the same as that of the insert cavity of the outer part and has intersecting passages forming a "T" shape. The head passage of the "T" is aligned with the perpendicular passage of the outer part.

The next step in the method includes rotating the ball within the safety valve housing to a position where flow from the tubing is prevented access to the upper passage of the housing. The blowout preventer is then removed from the upper part of the housing and a Christmas tree is installed to the upper part of the housing. The ball is then rotated within the valve housing to a position where the head passage of the "T" completes the vertical flow path from the tubing in the wellhead below to the Christmas tree above the safety valve housing. Where the apparatus is to be used in a safety mode, the method includes the step of rotating the ball to a position where a portion of the external surface of the ball having no passage extending through it covers and sealingly blocks the flow path from the tubing in the wellhead.

The method further includes connecting a diverter or "wing" valve to the lateral outlet of the housing and the step of rotating the ball to prevent access to the upper passage of the housing includes rotating the ball to a position where the head passage of the "T" is aligned with the lateral outlet of the housing and the base passage of the "T" is aligned with the tubing, and a portion of the external surface of the ball having no passage extending through it covers the flow path to the upper passage of the housing.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
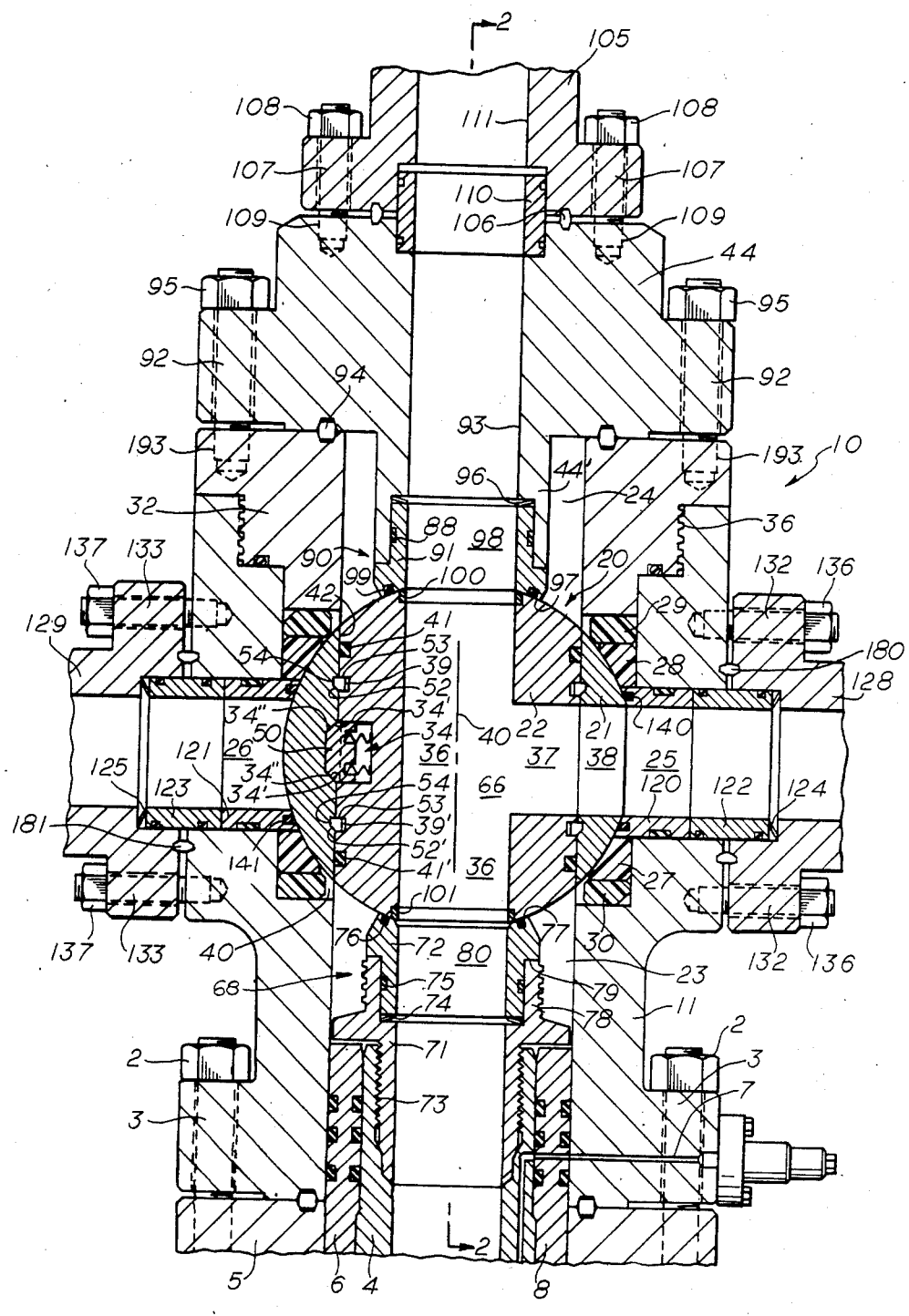
FIG. 1 is a cross-section of the valve according to the invention showing a housing, a rotatable ball and removable insert member and upper and lower tubing members connected within upper and lower passages in the housing.

FIG. 1 illustrates in a cross-section view the valve apparatus 10 according to the invention. The valve apparatus includes a housing 11, the bottom portion which may be attached to a tubing head 5 by means of studs 3 and nuts 2 in a conventional manner. A tubing hanger 4 may be landed in the tubing head 5 conventionally and extends upwardly into the lower passage 23 of the housing 11. A tubing hanger pack-off 6 is sealingly disposed between the lower part of the housing 11 and the tubing hanger 4. A conventional port 7 extends through the lower part of the housing 11 for communication with a passage in the tubing hanger for possible use with a downhole safety valve in the well.

As illustrated in FIG. 1, the housing 11 defines a lower passage 23 and an upper passage 24 as well as lateral outlets 25 and 26. The upper and lower passages and the two lateral outlets are open to a central chamber 40 in which is disposed a ball 20.

Figure 3B:
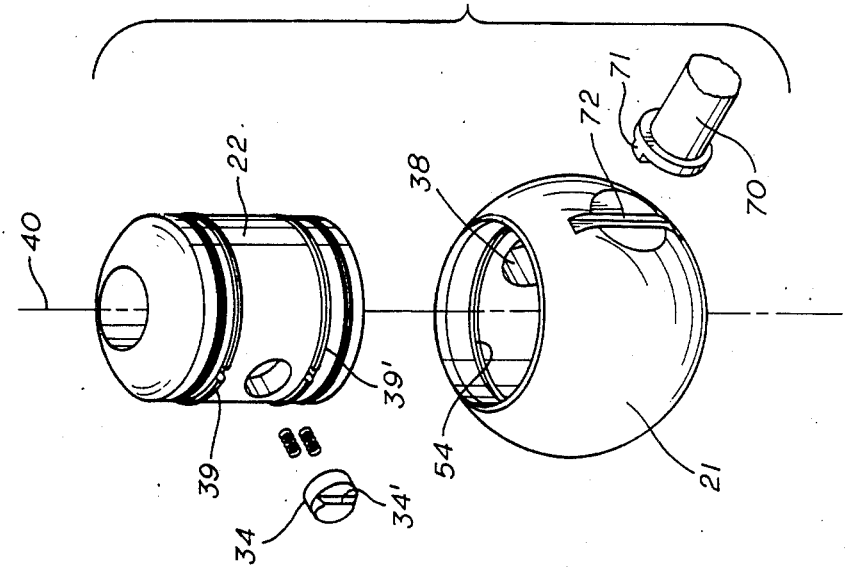
FIGS. 3A and 3B illustrate in exploded views the rotatable ball and insert member.
Figure 3A:
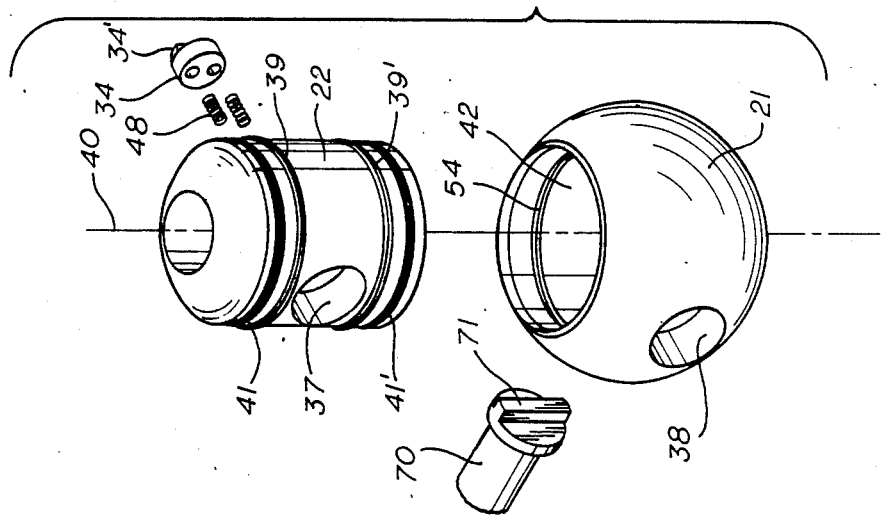

The ball 20 comprises an outer part 21 and inner part 22 which are shown in exploded views in FIGS. 3A and 3B. The ball is seated within chamber 40 by means of lower seat 27 and lower seat spacer 30 on which the ball 20 rests within the lower part of the central chamber 40. As illustrated in FIG. 1, the lower part of the outer part of the ball 21 contacts the lower seat 27. As will be shown below, the ball 20 is adapted to rotate within housing 11 bringing different parts of the ball into contact with seat 27. On the upper part of the ball 20, an upper seat 28 and an upper seat spacer 29 cooperate with a housing head 32 for securing the outer portion of the ball 20 within the central chamber 40. The housing head 32 is secured to the housing 11 by means of threaded surfaces 36 in a conventional fashion.

Advantageously, a perpendicular passage 38 is disposed in the outer part of the ball 21 which is perpendicular to the central axis 40 of the ball 20. When the ball 20 is oriented as illustrated in FIG. 1, the perpendicular passage 38 communicates with lateral outlet 25.

According to the invention, the inner part of ball 22 is insertable in and removable from the outer part of the ball 21. The outer part of the ball 21 has an insert cavity 42, (see also FIGS. 3A, 3B) the diameter of which is substantially the same as the diameter of the upper passage 24 and the lower passage 23 of housing 11. Thus, when the adapter flange 44 is not in place, the inner part of the ball 22 may be inserted through the upper passage 24 for landing within and securing to the outer part of the ball 21. The outer diameter of the inner part of the ball or "insert" is substantially the same as that of the upper passage 24 and the insert cavity 42 of the outer portion of the ball 21. Of course the outer diameter of the insert 22 is slightly smaller than the inner diameter of upper passage 24 and the outer part of ball 21 to provide clearance for passage during insertion and withdrawal.

As illustrated in FIGS. 1, 3A and 3B, the inner part of the ball 22 is inserted through the upper passage 24 into alignment and engagement with the outer part of the ball 21. An anti-rotation key 34 in the outer wall of the inner part of the ball 22 serves to angularly align the inner part of the ball 22 with the outer part of the ball 21. Springs 48 serve to force the anti-rotation key 34 outwardly into groove 50 such that the inner part of the ball 22 may have its outlet 37 angularly aligned with the perpendicular passage 38 of the inner part of the ball. The anti-rotation key 34 has inclined shoulders 34' which cooperate with complementary shoulders 34" on the inner wall of the insert cavity allowing the inner portion of the ball to snap into the groove 50 or conversely allow the inner part of the ball 22 to be removed from the insert cavity 42 of the outer part of the ball 21.

Latch means including the upper snap ring 39 and lower snap ring 39' serve to axially align the inner part of the ball 22 within the outer part of the ball 21 such that the outlet passage 37 in the inner part of the ball 22 is axially aligned with the perpendicular passage 38 of the inner part of the ball 21. The upper and lower snap rings 39, 39' within grooves 54 secure the inner part 22 to the outer part. The inclined surfaces 52 and 52' of snap rings 39 and 39' allow the inner part of the ball 22 to be pulled free from the outer part of the ball when the entire ball is rotated one hundred-eighty (180) degrees from that illustrated in FIG. 1.

In the orientation illustrated in FIG. 1 of the ball 20, the perpendicular shoulders 53 and 53' of the snap rings of the inner part of the ball 22 prevent the inner part of the ball 22 from being pulled or forced axially upwardly with respect to the outer part of the ball. In other words, the snap rings 39 and 39' serve to hold the inner part of the ball 22 within the outer part of the ball 21, yet allow the inner part of the ball 22 to be pulled out of the inner part of the ball when the entire ball is rotated one hundred-eighty (180) degrees. This feature of the invention facilitates servicing and access to the lower passage of the valve after the adapter flange 44 has been removed from the valve. Seals 41 and 41' seal the outer part of the ball with respect to the inner portion of the ball and may be elastomeric members installed in grooves about the periphery of the inner portion of the ball 22.

FIGS. 3A and 3B illustrate in perspective, the inner part of the ball 22 as it is being inserted downwardly into the insert cavity 42 of the outer part of the ball 21. FIG. 3A shows a view of the inner portion of the ball 22 and the outer portion of the ball 21 rotated one hundred-eighty (180) degrees from that illustrated in FIG. 3B. The views in 3A and 3B are exploded views showing the anti-rotation key 34 and springs 48 inserted in an outer wall of the inner part of the ball 22. Upper and lower snap rings 39 and 39' are also illustrated. Ball stem 70 is also illustrated in the exploded view along with coupling means 71 and 72 for coupling the ball stem 70 to the outer portion of the ball 21.

Returning now to FIG. 1, means are provided for coupling the tubing disposed in the tubing hanger 4 into the tubing head below with the ball 20. A coupling member 68 includes an upper member 72 and a lower member 71. The lower member 71 is inserted through the insert cavity 42 of the outer part of ball 21, where the inner part of the ball 22 has not yet been installed in the outer portion of the ball 21. The outer or lower coupling member 71 is threadedly fastened to the tubing hanger 4 by means of complementary threads 73. The upper member 72 fits within an upper neck 78 of the lower coupling member 71 and rests against upwardly facing shoulders 79 of lower coupling member 71. Seal 75 seals the upper coupling member 72 to the lower coupling member 71. Spring 74 is provided by which the upper coupling member 72 is urged upwardly against the inner portion of the ball 22 once it is installed in the outer portion of the ball 21.

An upwardly facing arcuately shaped surface 77 of the upper coupling member 72 is adapted to engage the exterior part of the ball 20. A seal 76 comprising an elastomeric member in a slot in the upwardly facing arcuately shaped surface 77 serves to seal the opening 80 in the coupling member 68 with respect to any passage in the ball which may be aligned with the lower coupling member.

In a similar manner, an upper coupling member 90 is provided to couple the ball with a conduit extending upwardly and installed in the upper passage 24 within the housing 11 and the housing head 32. The upper coupling member comprises the downwardly facing coupling member 91 and an extension 44' of the adapter flange 44 cooperatively provided to seal the upper portion of the ball with respect to an upper conduit 93. The adapter flange 44 is coupled to the housing head 32 by means of studs 92 threadedly secured within the housing head 32 by means of threads 193. A gasket 94 is provided in a conventional fashion. Nuts 95 secure the adapter flange 44 to the studs 92.

The adapter flange extension 44' bears against the lower coupling member 91 of the upper coupling assembly 90. Spring 96 provides a resilient downward force from the adapter flange extension 44' against the lower coupling member 91 and against the ball 20. A downwardly facing arcuately shaped surface 97 of the lower coupling member 91 engages the ball. A cylindrical conduit 98 of the lower coupling member 91 is provided to communicate with upper conduit 93 which may be in alignment with passages 37,38 or passage 36 of the ball 20. Seal 99 in surface 97 is provided to cooperate with the ball for sealing about any opening of the ball 20 with the opening or conduit 98 of the conduit of the upper coupling member 90.

Inserts 100 and 101 in the opening of the passage 36 of the inner portion of the ball are provided with hardened material such as tungsten carbide. Likewise, the lower portion 91 of the upper coupling assembly 90 and the upper coupling member 72 of the lower coupling assembly 68 are provided of a hardened material so that if a wireline were to extend through the upper conduit 98 through the passage 36 and through the lower conduit 80, turning of the ball 20 may cut such wireline between the hardened material 100 or 101 with the coupling members 91 or 72 acting as an anvil.

Figure 2:
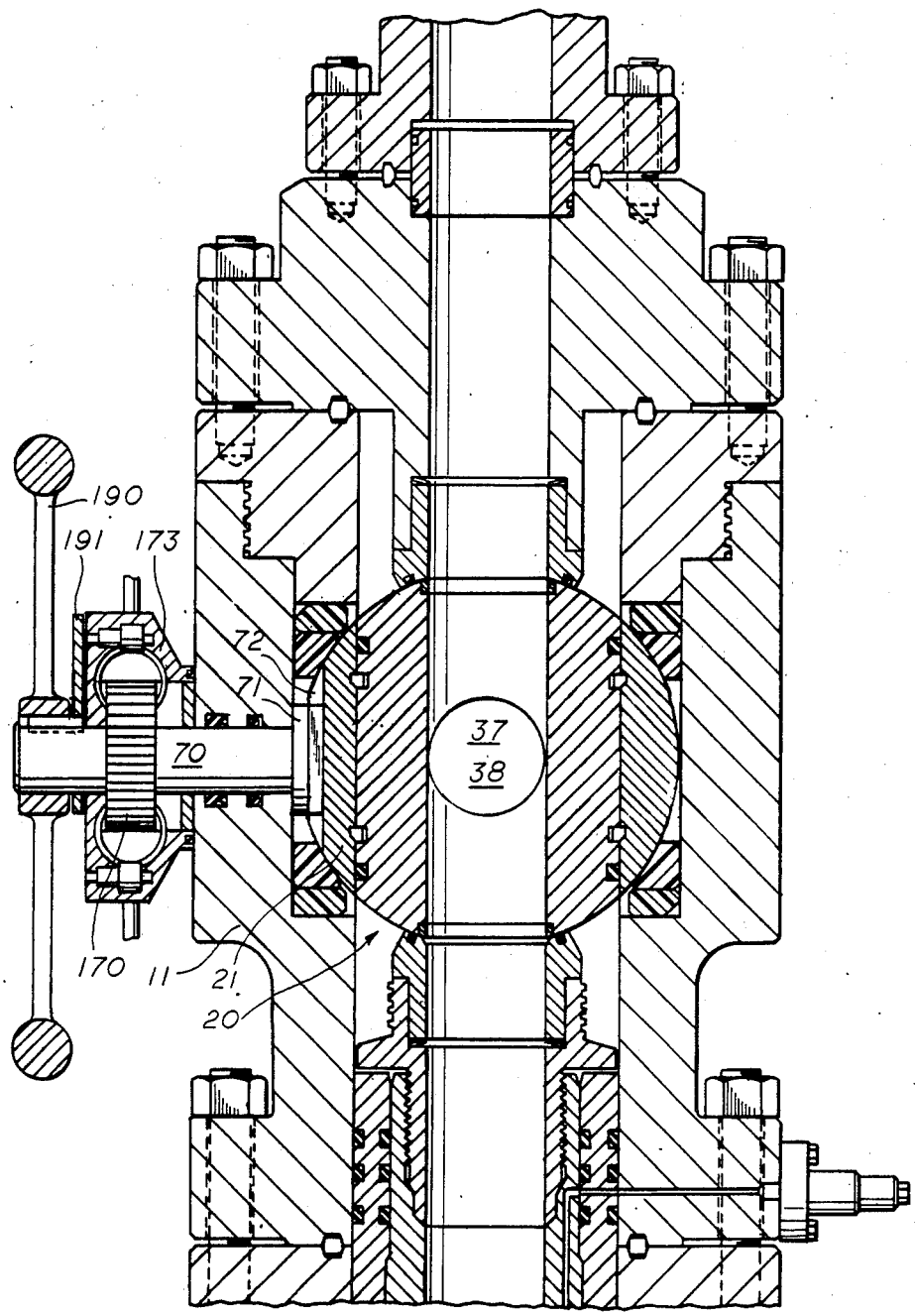
FIG. 2 is a cross-section of the valve through section lines 2—2 of FIG. 1 and showing the actuating means for rotating the ball.

Other apparatus may be attached to the top of the adapter flange 44. As illustrated in FIGS. 1 and 2, a valve flange 105 may be secured to the adapter flange 44 by means of threaded studs 107 and nuts 108. Studs 107 may be secured to the adapter flange 44 by means of threads 109. A head sleeve 110 may be provided to couple the conduit 93 with a similar conduit 111 in the valve flange which may communicate with a vertically extending Christmas tree or the like. Gasket 106 is provided to seal valve flange 105 from the adapter flange 44.

The invention which has been described to this point includes a ball disposed in a chamber of a valve housing in which an inner portion of the ball may be inserted with an outer portion of the ball. The inner portion may be removably secured through the upper passage of the housing. The insert cavity of the ball is of substantially the same diameter as the upper passage of the housing thereby permitting insertion of tubing and other apparatus through the insert cavity of the ball into the lower passage of the housing. The inner portion of the ball is provided with at least one passage therethrough which can communicate with conduits disposed in the lower passage of the ball and the upper passage of the ball. Thus, in its broadest aspects, the invention includes a rotatable ball and a housing and having an insert in the ball for preventing communication with cooperating upper and lower conduits in upper and lower passages of the housing. Thus, passage 36 in the inner portion of the ball 22 may communicate with an upper conduit 98 or a lower conduit 80 installed in the valve apparatus. When the ball is turned ninety (90) degrees from that illustrated in FIG. 1, the communication from the lower portion of the ball is prevented from the upper conduit 98. Thus, there is provided a ball valve with a removable insert which prevents or allows fluid communication between upper and lower conduits in the upper and lower passages of the housing. The removable feature of the ball allows, in an oilfield environment, installation or replacement of tubular components in or below the lower passage of the ball through a blowout preventer attached to the upper part of the housing without removing the valve housing from attachment to a wellhead or the like below the valve housing. Complete control over the well of course is provided by the valve during removal of the blowout preventer and replacement thereof with a Christmas tree, or vice versa.

In the preferred embodiment of the invention illustrated in FIG. 1, the outer portion of the ball has a perpendicular passage 38 and the inner portion of the ball has "T" shaped intersecting passages 36 and 37. The head of the "T" passage is provided substantially along the central axis 40 or the ball, whereas the intersecting passage of the inner part of the ball 37 is provided perpendicularly to the passage 36. For ease of description, the passage provided along the central axis of the ball as illustrated in FIG. 1 is termed "the head of the "T" passage" whereas the perpendicular passage in the inner portion of the ball 22 is termed "the base of the "T" passage".

As illustrated in FIG. 1, after the inner part of the ball 22 is inserted within the insert cavity 42 of the outer part of the ball 21, the base of the "T" passage 37 is aligned with the perpendicular passage 38 in the outer part of the ball 21. After the insert 22 is aligned and fixed within the outer portion of the ball by means of the alignment key 34 and the axially aligning and securing snap rings 39, 39', the parts of the ball act as a single unit, that is, a "T" passage comprising the head of the "T" passage 36 and the base of "T" passage 37 and the perpendicular passage 38 of the outer portion of the ball 21 move as a unit. Means to be described below allow the ball 20 to move three hundred-sixty (360) degrees within the chamber 66 of the valve 10.

The preferred embodiment of the valve according to the invention, includes at least one lateral outlet in the housing 11, preferably two. A first lateral outlet 25 and a second lateral outlet 26 are illustrated in FIGS. 1 and 2 and FIGS. 6 through 12 illustrating the operation of the valve according to the invention. Lateral ball seats 120 and 121 are provided for cooperating with the ball and are inserted within the lateral outlets 25 and 26, respectively, and for sealing with the housing 11. Seal sleeves 122 and 123 are provided and act with springs 124 and 125 to urge the seal sleeves 122 and 123 against the lateral ball seats 120 and 121 against the ball 20. The springs 124 and 125 are disposed in annular shoulders of lateral flanges 128 and 129 which are coupled to the housing by means of threaded studs 132 and 133 into the housing 11. Nuts 136 and 137 secure the lateral flanges 128 and 129 to the studs 132 and 133. Arcuately shaped surfaces on the end openings of the lateral ball seats 120 and 121 cooperate with the exterior of the ball 20 and the seals 140 and 141 act in cooperation with the springs 124 and 125 to sealingly engage the lateral ball seats 120 and 121 about the exterior of the ball and to seal an opening which may exist between the passage in the ball and the passage within the ball seat and seal sleeve which cooperate with the lateral conduits in flanges 128 and 129. Gaskets 180 and 181 are provided between the lateral flanges 128 and the housing 11 and the lateral conduit 129 and the housing 11.

FIG. 2 is a cross-section through the valve of the invention along section lines 2—2 of FIG. 1. FIG. 2 illustrates the valve stem 70 extending through a hole in the housing wall and shows coupling means 71 attached to the end of the valve stem 70 within cooperating receiving means 72 in the outer wall of the outer part of the ball 21. The valve stem 70 and the coupling means 71 and 72 are illustrated in the exploded views of FIGS. 3A and 3B. Fastened to the wall 11 is a housing 173 of a motive means for rotating the ball 20 within the housing 11. The motive means includes a hydraulic actuator as well as a mechanical actuator.

Figure 4:
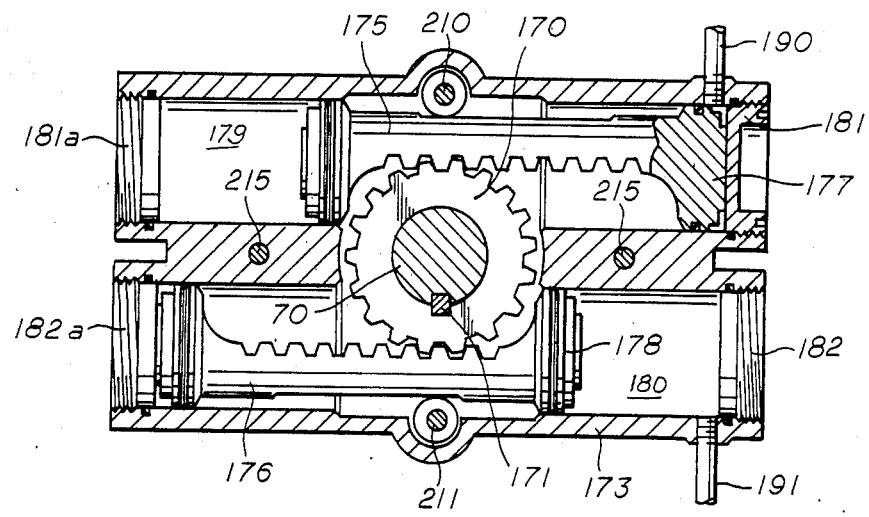
FIG. 4 shows hydraulic actuating means for rotating the ball.

The hydraulic actuator is illustrated in schematic form in FIG. 4. A pinion gear 170 is provided about the valve stem 70 and is held thereto by means of a key 171. Gear 170 is carried within the housing 173 which may be bolted to the valve body 11 so as to be removable therefrom and with the ball 20.

Disposed within the housing 173 are upper and lower racks 175 and 176 meshing with the pinion gear 170 and integral with pistons 177 and 178. The pistons are reciprocal horizontally within the cylinders 179 and 180 formed within and by the housing structure as illustrated, there being end caps 181 and 182 closing the cylinders at their heads. As fluid pressure is admitted via port 190 to drive piston 177 to the left, as illustrated in FIG. 4, the pinion gear 170 and valve stem 70 is rotated by rack 175 and drives rack 176 and piston 178 to the right thereby exhausting fluid from the space between piston 178 and end cap 182 via port 191. The hydraulic motive means illustrated in FIG. 4 is adapted primarily for emergency purposes; that is, when it is desired to quickly and remotely shut off fluid from the lower passage 80 of the conduit disposed in the lower passage 23 of the valve, it is desired to be able to turn the ball ninety (90) degrees so that a portion of the ball having no port extending therethrough may seal about the upper coupling member 72 provided in communication with any tubing disposed below in the wellhead.

Therefore, the hydraulic actuator depicted in FIG. 4 is constructed such that caps 181 and 182 limit turning of the ball to an angular rotation of ninety (90) degrees so that the valve may be quickly and remotely turned to a full off or safety position. On the other hand, it is desired that the ball may be turned fully about three hundred-sixty (360) degrees such that various orientations may be achieved with the ball within the housing 11. Therefore, the portion of the cylinders to the left of the pinion gear are constructed with end caps 181a and 182a allowing rotation two hundred-seventy (270) degrees from that depicted in FIG. 1. The hydraulic actuator being primarily for emergency safety operation of the valve, a mechanical hand wheel 190 is also provided about the valve stem 70 for mechanically turning the valve to various positions as will be discussed in more detail below.

It is believed that the operation of the valve would primarily by the mechanical hand wheel 190 with the hydraulic actuator being reserved for emergency purposes, but, of course, the valve could be operated entirely hydraulically where desired. A position indicator 191 is provided about the valve stem 70 with a pointer means (not illustrated) whereby a person mechanically operating the valve may be informed, by the pointer on the indicator, of the position of the ball 20 within the housing 11.

Figure 5:
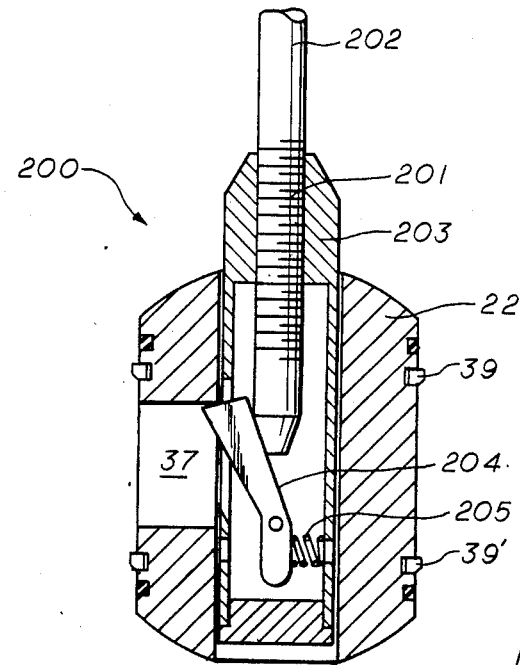
FIG. 5 illustrates a running tool inserted within the insert member for inserting the insert member in the insert cavity of the outer ball.

FIG. 5 illustrates a means for inserting the inner part of the ball 22 within the insert cavity 42 of the outer part of the ball 21. Insertion is performed where the adapter flange 44 is not attached to the housing head 32 of the housing 11, but would be used where the lower coupling 68 has been installed in communication with tubing landed in a tubing hanger below the lower passage of housing 11. As illustrated in FIG. 5, the insert running tool 200 includes a body 203 threadedly secured with a rod 202 by means of threads 201. The illustration of FIG. 5 is from a point one hundred-eighty (180) degrees from that illustrated in FIG. 1 where the base passage 37 of the inner part of the ball 22 is facing to the left rather than facing to the right as illustrated in FIG. 1.

In the position indicated of the running tool of FIG. 5, an arm member 204 engaged by the end of rod 202 extends within the opening of the passage 37. After the inner part of the ball 22 has been inserted within the outer part of the ball 21 (See FIG. 1) and the upper snap rings 39 and lower snap rings 39' have been cooperatively engaged with the grooves in the outer portion of the ball, the rod 202 is turned until it moves upwardly by means of the threads 201. After the rod 202 moves upwardly sufficiently to clear the end of arm 204, the spring 205 forces the arm member 204 to the right out of the passage 37. The running tool 200 then comes out of engagement within passage 37 and may be removed upwardly through the upper passage 24 with the inner part of the ball 22 remaining within the outer part of the ball 21.

The inner part of the ball 22 may be retrieved in a similar fashion where the spring 205 may be oriented to keep arm 204 within the head passage of the "T" of the inner bore. By turning the rod 202 in the opposite direction, the arm 204 is forced into the passage 37 whereby an upward movement of rod 202 causes the inner part of the ball 22 to be removed from the outer part 21.

FIGS. 6 through 12 illustrate preferred environments in which the valve may be used. Turning first to FIGS. 6 through 10, an environment is illustrated where the valve apparatus according to the invention is used to maintain complete control over a well during the time that production tubing is being installed in the well and until and after a Christmas (production) tree is installed for production of the well.

Figure 6:
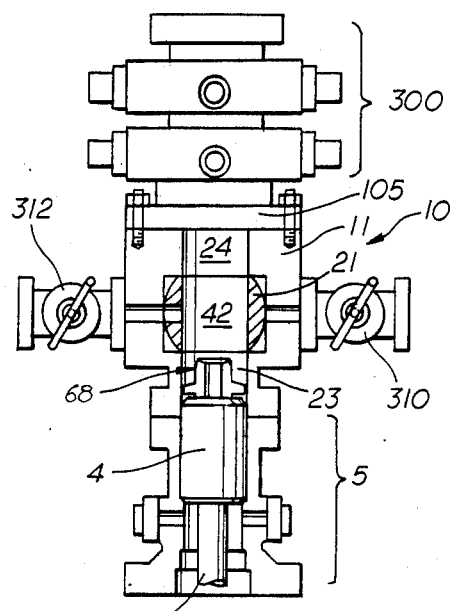
FIG. 6 illustrates the apparatus used as a safety valve between a tubing head and a blowout preventer stack during installation or workover of production tubing in the tubing head through the insert cavity of the ball where the inner part of the ball has been removed or not yet installed.

FIG. 6 illustrates the apparatus assembled where the valve housing 11 according to the invention is attached between a tubing head 5 and a blowout preventer stack 300. The outer part of the ball 21 is installed in the housing 11 but the inner part of the ball which may be inserted in the insert cavity 42 has not yet been installed. The blowout preventer stack 300 is attached to the valve housing by means of a flange 105 as described previously. A tubing hanger 4 has been landed in the tubing head and a coupling member 68 for coupling with the tubing 301. The tubing 301 has been installed through the vertical flow path of the blowout preventer stack and down through the upper passage 24, the insert cavity 42 and through the lower passage 23. The wing or diverter valves 310 and 312 are provided in communication with the lateral outlets of the valve 10. Thus, it is seen from FIG. 6 that complete control over the well is established by means of the blowout preventer stack 300 while the valve 10 housing and the outer portion of the ball 21 is in place atop the tubing head 5. Any emergency conditions in the well could at this point be controlled by means of the blowout preventer stack 300.

Figure 7:
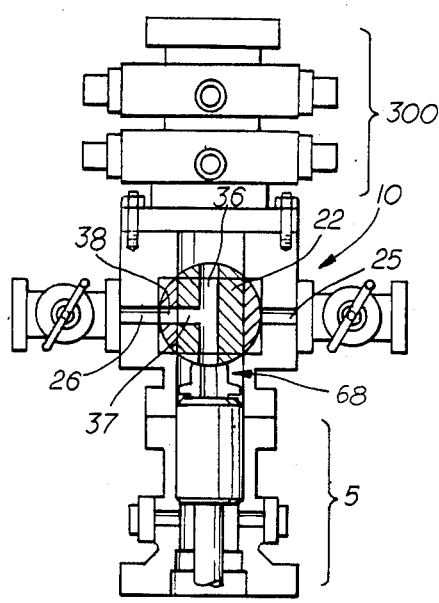
FIG. 7 illustrates the apparatus of FIG. 6 after the inner part of the ball has been inserted, aligned and latched within the outer part of the ball by means of the running tool of FIG. 5.

FIG. 7 illustrates the condition of the apparatus after the inner part or insert of the ball 22 is installed in the insert cavity 42 of the valve 10. The insert 22 is illustrated where the head of the "T" shaped passage 36 is vertically aligned and the base of the intersecting "T" shaped passage is aligned with the perpendicular passage 38 of the outer part of the ball. In this orientation, the perpendicular passage 38 is aligned with the lateral outlet 26. Of course, the outer portion of the ball and the insert could be aligned with the lateral outlet 25. In this condition of the valve, vertical communication is established between the coupling member 68 and the head of the "T" passage 36.

Figure 8:
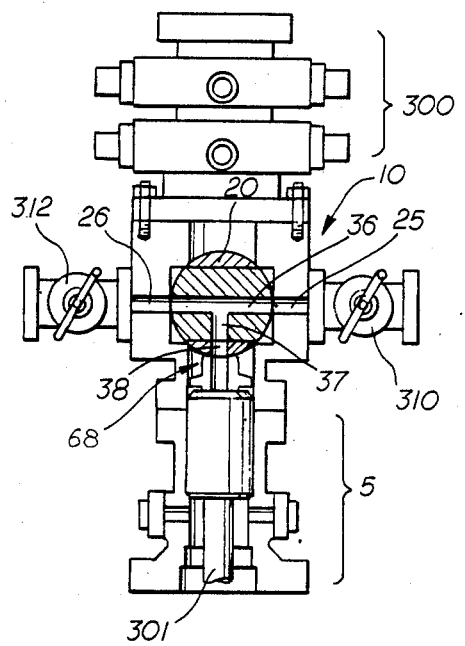
FIG. 8 illustrates the apparatus of FIG. 7 after the ball has been rotated aligning the base of the "T" passages with the tubing and the head of the "T" passages with the lateral outlets.

FIG. 8 illustrates the condition of the valve apparatus after the ball 20 has been rotated ninety (90) degrees from that illustrated in FIG. 7. In FIG. 8, the ball has been rotated to a point where the head of the "T" shaped passage 36 is in line with the lateral passages 26 and 25 and the base of the "T" shaped passage in the ball comprising passages 37 and 38 are in communication with the tubing via coupling member 68. In this condition of the valve, control over the well may be established by means of the diverter valves 312 and 310. For example, if there should be a kick or bubble in the production tubing, such condition may be controlled by diverting pressurized fluid flow from tubing 301 via either or both of the wing valves 310, 312 communicating with conduits away from the well. For example, if the installation is on an offshore platform, conduits extending to either side of the platform could be used to divert dangerous pressurized fluid from the well.

Figure 9:
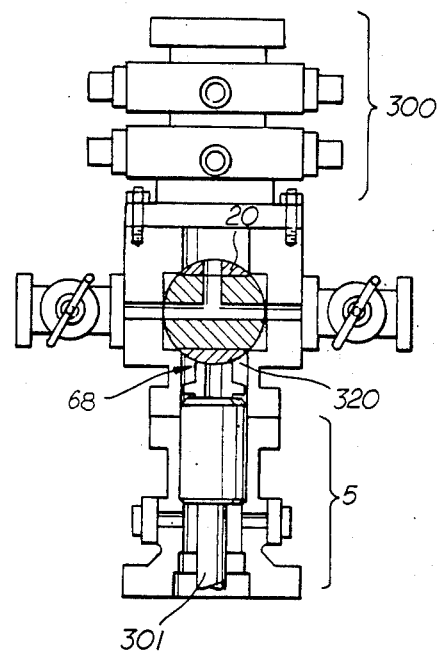
FIG. 9 illustrates the apparatus of FIG. 7 after the ball has been rotated 180° from that shown in FIG. 8 to a position where a portion of the ball having no passage through it is aligned with the tubing.

FIG. 9 shows an alternative condition of placement of the ball 20 for complete control over the well. In this illustration, the ball has been rotated one hundred-eighty (180) degrees from that illustrated in FIG. 8. A portion of the ball not having an exterior port through it has been rotated where it blocks fluid communication from coupling member 68 and hence tubing 301. This is the condition which might be automatically provided by the hydraulic actuating means described in FIG. 4 which could be remotely operated and completely prevent pressurized fluid from flowing upwardly from the wellhead 5.

Figure 10:
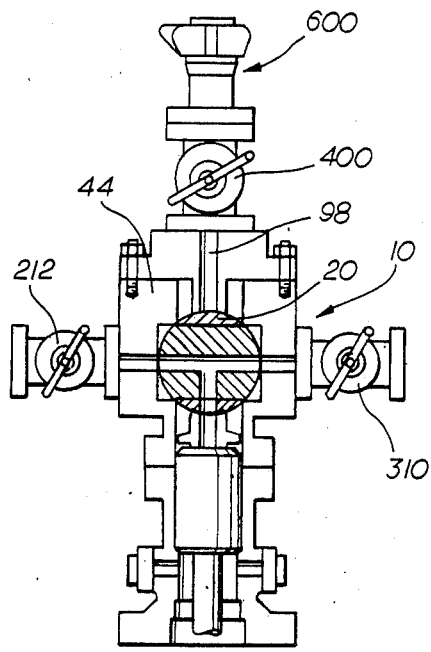
FIG. 10 illustrates an invention used in a master valve in a "short" or horizontal tree embodiment and showing a swab valve attached to the upper passage of the housing.

FIG. 10 illustrates one environment in which the valve apparatus according to the invention may be used. In the configuration illustrated, the valve 10 is used as a master valve in a "short" tree. In normal use, the ball 20 serves as the master valve of the apparatus and the well is produced via the wing vlaves 312 or 310. A cap (not illustrated) over the upper passage of the housing may be installed to complete the short tree embodiment.

Alternatively as illustrated in FIG. 10, a swab valve assembly 400 may be attached to the top of the apparatus housing by means of an adapter flange 44. Thus, the well may have swabbing work done on it when the ball 20 is rotated ninety (90) degrees from that illustrated in FIG. 10. An adapter 600 may be placed atop the swab valve 400 for connecting a lubricator in the normal way. Because of the low profile of the wellhead and safety valve 10 illustrated in FIG. 10, the lubricator may be spaced such that wireline tools do not straddle a normally installed vertical Christmas tree and the safety valve at the same time.

Figure 12:
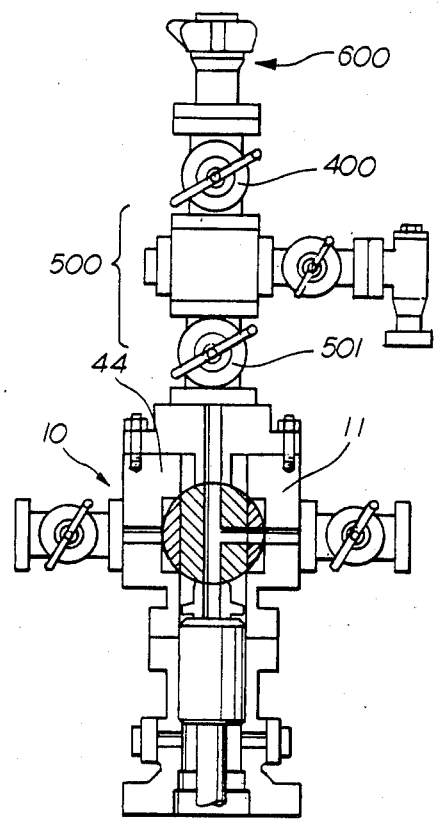
FIG. 12 illustrates the valve of the invention used as a safety valve between a tubing head and a Christmas tree and further illustrating a swab valve and adapter attached to the top of the tree.
Figure 11:
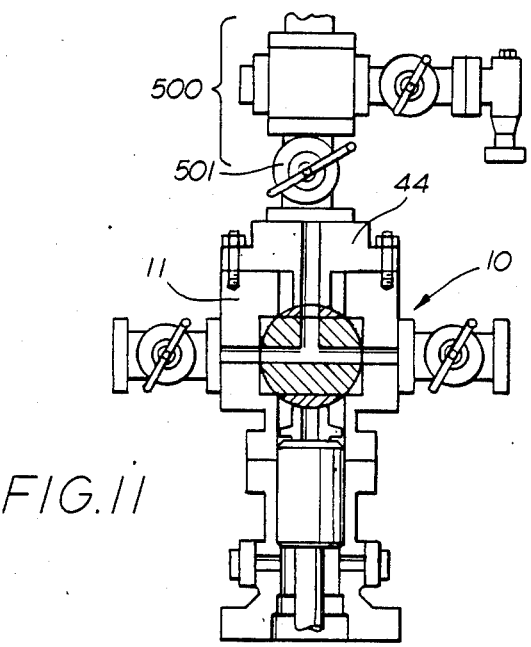
FIG. 11 illustrates the safety valve of FIG. 10 with a Christmas tree attached at its top and where the valve has been rotated to completely shut off flow from the production tubing.

FIGS. 11 and 12 illustrate the valve 10 in which a normal vertical Christmas tree 500 is attached to the top of the housing 11 by means of an adapter flange 44. The usual master valve 501 is part of the vertical Christmas tree. FIG. 12 illustrates the attachment of a swab valve 400 to the top of the Christmas tree 500 and additionally illustrates adapter 600 attached to the top of the swab valve in which a lubricator for wireline work may be established. In the assemblies illustrated in FIGS. 11 and 12, well control could be obtained by using the wing valves and lateral conduits as "kill" passages where the ball is rotated to the position illustrated in FIG. 10. Control fluid could then be pumped into the well to bring the well under control. Procedures such as circulation, bullheading, pressure relieving, in addition to killing, could also be performed via the lateral passages and control valves, prior to vertical re-entry of the well as described previously.

Various modifications and alterations in the described structures will be apparent to those skilled in the art of the foregoing description which does not depart from the spirit of the invention. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. A safety valve comprising,
    a housing having at least one lateral outlet, an upper passage and a lower passage, each of the outlet and upper and lower passages being open to a chamber in the housing, and
    a rotatable ball having
    an outer part with means for seating it within the chamber, said outer part having an insert cavity along a central axis of the outer part, the insert cavity having an inner diameter substantially the same as or less than that of the upper passage, said outer part having a perpendicular passage extending from the insert cavity to the exterior of the outer part, and a removable inner part disposed in said insert cavity and having an outer diameter substantially the same as that of the insert cavity of the outer part and having a head passage communicating with a base passage, the head passage being along said central axis and the base passage being aligned with the perpendicular passage of the outer part.

2. The valve of claim 1 further comprising means for angularly aligning the base passage of said inner part with the perpendicular passage of said outer part after said inner part is inserted into said outer part.

3. The valve of claim 2 wherein said angular aligning means comprises a spring loaded anti-rotation key means disposed on the exterior surface of the inner part and a depression means in the interior surface of the insert cavity for angularly locking the inner part in the insert cavity of the outer part and alignment of the base passage of the inner part with the perpendicular passage of the outer part but allowing the inner part to move with respect to the outer part along the central axis.

4. The valve of claim 1 further comprising, means for axially aligning the base passage of said inner part with the perpendicular passage of said outer part after said inner part is inserted into said outer part.

5. The valve of claim 4 wherein said axial aligning means comprises snap ring means disposed about the outer wall of the inner part and a groove means about the inner wall of the insert cavity of the outer part for cooperatively holding the inner part to the outer part on axial alignment of the outer part with respect to the inner part after insertion of the inner part in the insert cavity and for allowing the inner part to be pulled axially free from the outer part in one direction along the central axis of the outer part but not the other.

6. The valve of claim 4 wherein said axial aligning means comprises, cooperating landing shoulders on the outer wall of the inner part and the interior wall of the insert cavity.

7. The valve of claim 1 having two lateral outlets open to the chamber in the housing.

8. The valve of claim 1 further comprising means for seating the exterior of the ball with the lateral outlet.

9. The valve of claim 8 wherein the seating means is an arcuate annular surface about the opening of said lateral outlet, the curvature of said surface being substantially the same as the curvature of said ball.

10. The valve of claim 9 further comprising means for sealing the exterior of the ball with the lateral outlet.

11. The valve of claim 10 wherein the sealing means is an elastomeric member disposed in a slot in the annular surface about the opening of said lateral outlet.

12. The valve of claim 1 further comprising a lower conduit placed in said lower passage, and means for seating the exterior of the ball with said lower conduit.

13. The valve of claim 12 wherein said lower conduit is a coupling member disposed in the lower passage of the housing and having an upwardly facing opening to said chamber and being in fluid communication with tubular members extending below from the lower passage of the housing, and the seating means is an arcuate annular surface about the opening of said coupling member, the curvature of said surface being substantially the same as the curvature of said ball.

14. The valve of claim 13 wherein said coupling member includes spring means for urging said annular surface against the exterior of the ball.

15. The valve of claim 14 wherein said coupling member has an upper part and a lower part, the lower part being removably fixed with respect to the housing, the upper part including said arcuate annular surface and said spring means is between an upwardly facing surface on the lower part and a downwardly facing surface on the upper part whereby the spring means acts to urge the upper part upwardly with respect to the housing.

16. The valve of claim 13 further comprising sealing means for sealing said coupling member to the exterior of the ball.

17. The valve of claim 16 wherein said sealing means is an elastomeric member in a slot in the annular surface about the opening of said coupling member.

18. The valve of claim 12 further comprising means for seating the exterior of the ball with an upper conduit placed in said upper passage.

19. The valve of claim 18 wherein the seating means is an arcuate annular surface about the opening of said upper conduit, the curvature of said surface being substantially the same as the curvature of said rotatable ball.

20. The valve of claim 19 further comprising sealing means for sealing said upper conduit to the exterior of the ball.

21. The valve of claim 20 wherein said sealing means is an elastomeric member in a slot in the annular surface about the opening of said upper conduit.

22. The valve of claim 1 further including sealing means for sealing the inner part with respect to the outer part.

23. The valve of claim 1 further comprising means for rotating said ball within the housing.

24. The valve of claim 23 wherein said rotating means includes ball stem means extending through said housing, one end of said ball stem means having coupling means for rotatably coupling said ball stem means to said ball, the other end of said ball stem means extending through the outer wall of said housing, and motive means coupled to the other end of said ball stem for rotating said stem and ball.

25. The valve of claim 24 wherein said motive means comprises a hydraulically driven rotary actuator coupled to the end of the shaft.

26. The valve of claim 24 wherein said motive means comprises a hand wheel removably mounted upon the end of said shaft, and a hydraulically driven rotary actuator coupled to the end of the shaft.

27. The valve of claim 23 further comprising a shaft mounted position indicator means mounted on the end of said shaft for providing a visual indication of the shaft rotation and the position of the ball within the housing.

28. The valve of claim 1 further comprising cutting means secured in the head passage of the inner part for cutting.

29. The valve of claim 7 further comprising two diverter valves, one each attached to each of the two lateral outlets.

30. A safety valve comprising,
a housing having at least one lateral outlet,
an upper cylindrical passage and a lower cylindrical passage, each of the outlet and upper and lower passages being open to a chamber in the housing, and a rotatable ball having
an outer part with means for seating it within the chamber, said outer part having a cylindrical insert cavity along a central axis of the outer part, the insert cavity having an inner diameter substantially the same as or less than that of the upper cylindrical passage and a perpendicular passage,
a removable inner cylindrical part having an outer diameter substantially the same as that of the insert cavity of the outer part and having a head passage communicating with a base passage, the head passage being along said central axis and the base passage being aligned with the perpendicular passage of the outer part,
means for seating and sealing the ball with a lower conduit placed in said lower passage, and
means for rotating said ball within the housing to a position where a portion of the external surface of the ball having no passage extending through it covers the lower conduit, thereby blocking the flow path from the lower conduit.

31. Valve apparatus comprising,
a housing having two lateral outlets,
an upper cylindrical passage and a lower cylindrical passage, each of the outlets and upper and lower passages being open to a chamber in the housing, and a rotatable ball having
an outer part with means for seating it within the chamber, said outer part having a cylindrical insert cavity along a central axis of the outer part, the insert cavity having an inner diameter substantially the same as or less than that of the upper cylindrical passage and having a perpendicular passage,
a removable inner cylindrical part having an outer diameter substantially the same as that of the insert cavity of the outer part and having a head passage communicating with a base passage forming a "T" shape, the head passage of the "T" being along said central axis and the base passage of the "T" being aligned with the perpendicular passage of the outer part,
means for seating and sealing the ball with a lower conduit placed in said lower passage,
means for seating the exterior of the ball with the lateral outlets,
means for seating the exterior of the ball with an upper conduit placed in said upper passage, and
means for rotating said ball among at least four positions:
a first position where the head passage completes a fluid flow path from said lower conduit to said upper conduit and said perpendicular passage is in fluid communication with a first of said lateral outlets,
a second position where the head passage is in fluid communication with said lateral outlets, said perpendicular passage is in fluid communication with said lower conduit, and a portion of the external surface of the ball having no passage extending through it covers the upper conduit thereby blocking the flow path to the upper conduit,
a third position where the external surface of the ball having no passage extending through it covers the lower conduit thereby blocking the flow path from the lower conduit and the head passage is aligned with the two lateral outlets and the perpendicular passage is aligned with the upper conduit, and
a fourth position where the head passage completes a fluid flow path from said lower conduit to said upper conduit and said perpendicular passage is in fluid communication with a second of the lateral outlets.

32. The valve of claim 31 further comprising axial aligning and releasably retaining means for aligning and releasably retaining the inner part within and to the outer part whereby after insertion of said inner part within the insert cavity of the said outer part, said inner part may be removed from said outer part by axially pulling of said inner part with respect to said outer part.

33. A ball adapted for use in a safety valve, the safety valve having a housing with lower and upper passages disposed therein and at least one laterally disposed outlet and a chamber disposed between the ends of the outlet and passages, the chamber adapted to accept said ball, said ball comprising,
an outer part having an insert cavity along a central axis of the outer part with an inner diameter substantially the same as or less than the diameter of the upper passage of the housing, said outer part having a perpendicular passage extending from the insert cavity to the exterior of the outer part, and
a removable inner part having an outer diameter substantially the same as that of the insert cavity of the outer part and having a head passage communicating with a base passage, the head passage being along said central axis and the base passage being aligned with the perpendicular passage of the outer part.

34. The ball of claim 33 further comprising means for angularly aligning the base passage of said inner part with the perpendicular passage of said outer part after said inner part is inserted into said outer part.

35. The ball of claim 34 wherein said angular aligning means comprises
a spring loaded anti-rotation key means disposed on the exterior surface of the inner part and a depression means in the interior surface of the insert cavity for angularly locking the inner part in the insert cavity of the outer part and alignment of the base passage of the inner part with the perpendicular passage of the outer part but allowing the inner part to move with respect to the outer part along the central axis.

36. The ball of claim 33 further comprising,
means for axially aligning the base passage of said inner part with the perpendicular passage of said outer part after said inner part is inserted into said outer part.

37. The ball of claim 36 wherein said axial aligning means comprises
snap ring means disposed about the outer wall of the inner part and a groove means about the inner wall of the insert cavity of the outer part for cooperatively holding the inner part to the outer part on axial alignment of the outer part with respect to the inner part after insertion of the inner part in the insert cavity and for allowing the inner part to be pulled axially free from the outer part in one direction along the central axis of the outer part but not the other.

38. The ball of claim 36 wherein said axial aligning means comprises
cooperating landing shoulders on the outer wall of the inner part and the interior wall of the insert cavity.

39. The ball of claim 33 further comprising, cutting means secured in the head passage of the inner cylindrical part for cutting.

40. A safety valve comprising,
a housing having an upper cylindrical passage and a lower cylindrical passage, each of the upper and lower passages being open to a chamber in the housing,
a rotatable ball disposed in said chamber, the ball having an outer part, the outer part having a cylindrical insert cavity along a central axis of the outer part, the insert cavity having an inner cylindrical diameter substantially the same as or less than that of a full cylindrical diameter access of the upper passage, and
a mechanically releasably removable inner part disposed in said insert cavity having an outer diameter substantially the same as that of the insert cavity of the outer part and having a passage through it along said central axis,
latch means interengaged between said inner part and said insert cavity, whereby,
when said removable inner part is removed from said outer part and said central axis of the outer part is aligned with the upper and lower passages, the full diameter access through the insert cavity is provided to the lower passage from the upper passage.

41. A safety valve comprising,
a housing having an upper cylindrical passage and a lower cylindrical passage, each of the upper and lower passages being open to a chamber in the housing,
a rotatable ball disposed in said chamber, the ball having an outer part, the outer part having a cylindrical insert cavity along a central axis of the outer part, the insert cavity having an inner cylindrical diameter subtantially the same as or less than that of a full cylindrical diameter access of the upper passage,
a mechanically releasably removable inner part disposed in said insert cavity having an outer diameter substantially the same as that of the insert cavity of the outer part and having a passage through it along said central axis,
means for rotating said ball between at least three positions:
a first position where the passage of the inner part is aligned with the upper and lower passages of the housing allowing fluid communication between the upper and lower passages of the housing,
a second position where a portion of the outer part of the ball having no passage extending through it covers the lower passage thereby closing the flow path from the lower passage to the upper passage of the housing, and
a third position where said ball is rotated 180° from said first position to operably allow mechanical release and removal of the inner part from said outer part, and
latch means interengaged between said inner part and said outer part for allowing removal of said inner part in the third position while preventing removal of said inner part in the first position,
whereby
when said removable inner part is removed from said outer part and said central axis of the outer part is aligned with the upper and lower passages, the full diameter access through the insert cavity is provided to the lower passage from the upper passage.

42. A production tree for use with an oil and well comprising,
a master valve having
a housing having at least one lateral outlet, an upper passage and a lower passage, each of the outlet and upper and lower passages being open to a chamber in the housing, and
a rotatable ball having
an outer part with means for seating it within the chamber, said outer part having an insert cavity along a central axis of the outer part, the insert cavity having an inner diameter substantially the same as or less than that of the upper passage, said outer part having a perpendicular passage extending from the insert cavity to the exterior of the outer part,
a removable inner part disposed in said insert cavity and having an outer diameter substantially the same as that of the insert cavity of the outer part and having a head passage communicating with a base passage, the head passage being along said central axis and the base passage being aligned with the perpendicular passage of the outer part,
the housing of said master valve being connected to a tubing head of the well,
means for coupling production tubing landed in the well with the lower passage of said master valve, and
control valve means attached to said lateral outlet for controlling fluid flow in the production tubing in the well.

43. The production tree of claim 42 further comprising,
means for attaching a blowout preventer to the upper passage of said housing, whereby control over the well is maintained during removal of said inner part of said ball during workover operations of the well.

44. The production tree of claim 42 further comprising,
means for capping said upper passage of said housing.

45. A safety valve adapted for use in an oil well comprising,
a wellhead,
a housing having coaxial upper and lower vertical housing passages, a full diameter access of the upper and lower passages being sufficiently large to pass a tubing hanger with tubing for landing in said wellhead, said wellhead secured to said housing,
control element means having a removable inner part, said control element means disposed between said upper and lower vertical housing passages for preventing or allowing fluid flow through a passage in the inner part smaller than the lower vertical housing passage and for providing the full diametrical access via the upper housing passage to the lower housing passage upon removal of the inner part, and latch means interengaged between said inner part and said insert cavity.

46. The valve of claim 45 further comprising,
a blowout preventer secured to said housing and communicating with the upper passage, and
said wellhead secured to said housing and communicating with the lower passage.

47. The valve of claim 45 further comprising,
a Christmas tree secured to said housing and communicating with the upper passage, and
said wellhead secured to said housing and communicating with the lower passage.

* * * * *